March 23, 1954   C. C. FREY   2,673,319
MOTOR REVERSING MECHANISM
Filed Feb. 13, 1952   3 Sheets-Sheet 1
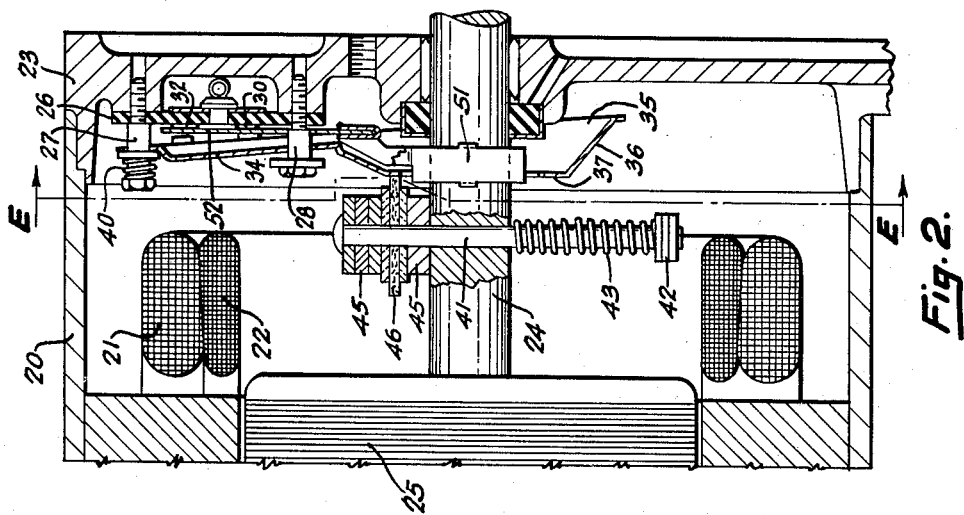
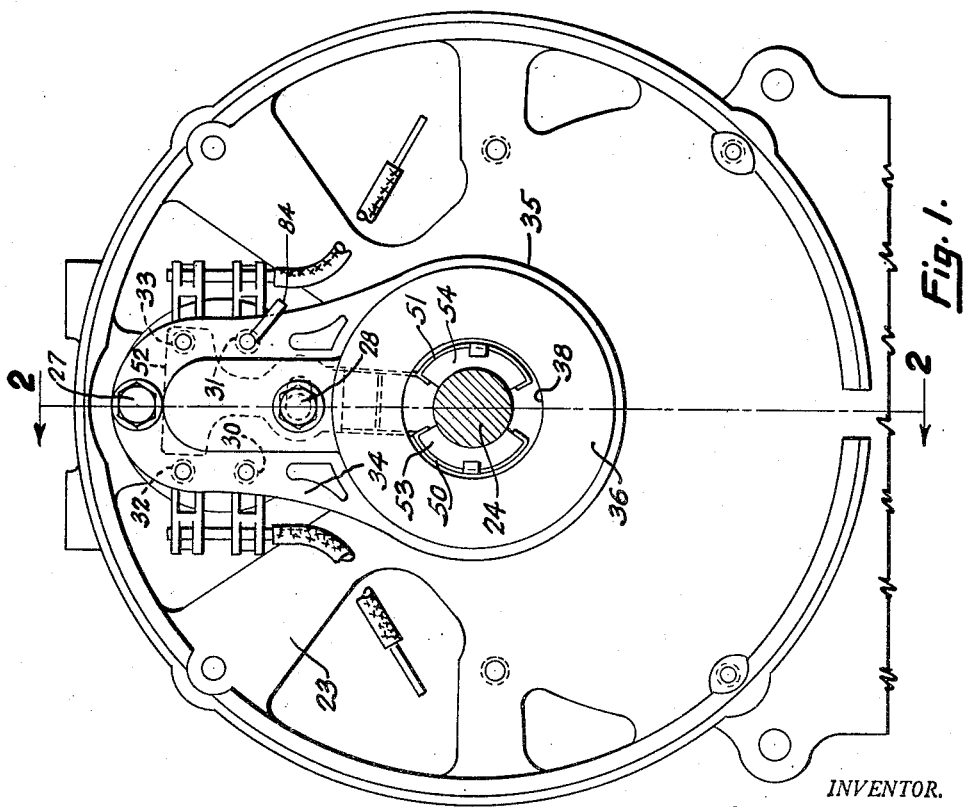
INVENTOR.
CLYDE C. FREY
BY
*Willits, Hardman and Fehr*
HIS   ATTORNEYS.

March 23, 1954 C. C. FREY 2,673,319
MOTOR REVERSING MECHANISM
Filed Feb. 13, 1952 3 Sheets-Sheet 2

INVENTOR.
CLYDE C. FREY
BY
Willits, Hardman and Fike
HIS ATTORNEYS.

March 23, 1954 — C. C. FREY — 2,673,319
MOTOR REVERSING MECHANISM
Filed Feb. 13, 1952 — 3 Sheets-Sheet 3
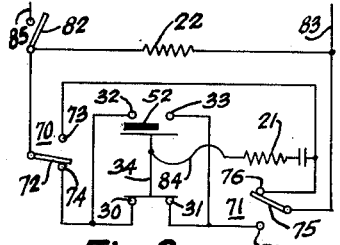
Fig. 8.
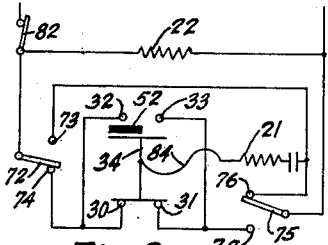
Fig. 9.
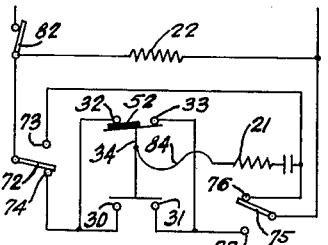
Fig. 10.
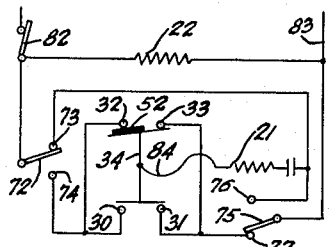
Fig. 11.
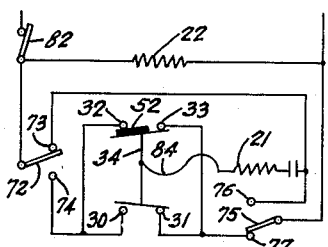
Fig. 12.
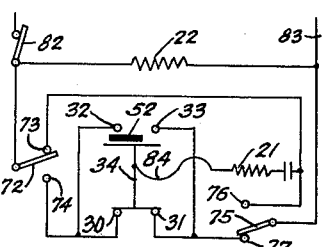
Fig. 13.
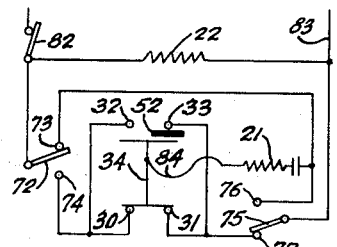
Fig. 14.
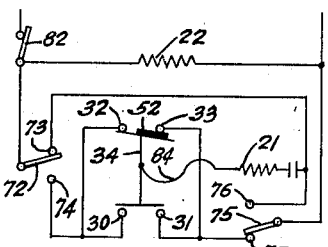
Fig. 15.
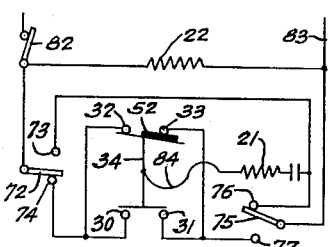
Fig. 16.
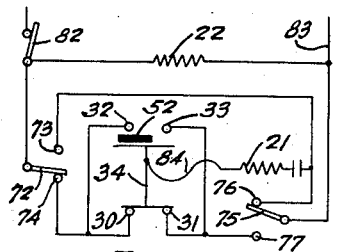
Fig. 17.
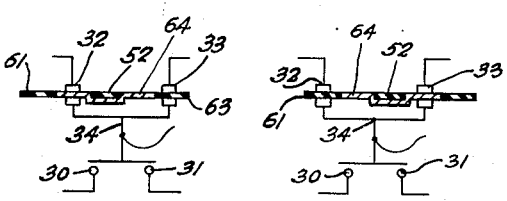
Fig. 19.   Fig. 20.
Fig. 18.
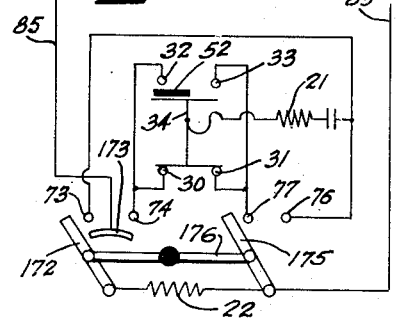
INVENTOR.
CLYDE C. FREY
BY
Willits, Hardman and Fehr
HIS ATTORNEYS.

Patented Mar. 23, 1954

2,673,319

UNITED STATES PATENT OFFICE 2,673,319

MOTOR REVERSING MECHANISM

Clyde C. Frey, Dayton, Ohio, assignor to General Motors Corporation, Detroit, Mich., a corporation of Delaware Application February 13, 1952, Serial No. 271,410

9 Claims. (Cl. 318—207)

This invention relates to an improved reversing mechanism for single phase electric motors.

It is among the objects of the present invention to provide circuit control mechanism of simple structure and design, operative to effect substantially instantaneous reversal of single phase electric motor operation.

A further object of the present invention is to provide a motor reversing mechanism particularly adaptable for use in an electric motor having starting and running windings, said mechanism consisting of a motor controlled switch operative automatically to control the electrical circuits through the starting winding and a selector switch operative to control the electrical connection between the electric motor and a source of electric power.

Further objects and advantages of the present invention will be apparent from the following description, reference being had to the accompanying drawings wherein a preferred embodiment of the present invention is clearly shown.

In the drawings:

Fig. 1 is an inside end view of the switch supporting end housing of an electric motor equipped with the present invention. The view is taken in the direction of the arrows E—E in Fig. 2.

Fig. 2 is a fragmentary, cross-sectional view of the electric motor and its centrifugally actuated switch mechanism taken along the line 2—2 of Fig. 1.

Figs. 8, 9, 10, 11, 12, 13, 14, 15, 16 and 17 are diagrammatic views showing the various elements of the reversing mechanism and their electrical connections with the source of power at various progressive intervals during the starting, running and reversing cycles of the electric motor.

Fig. 18 is a diagrammatic view showing the main circuit control switch and the reversing switches combined so as to be concurrently operative.

Figure 3:
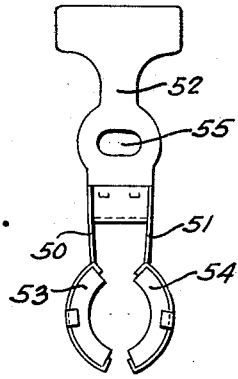
Fig. 3 is a front, detail view of the motor actuated, circuit interrupting element associated with the centrifugal switch.

Fig. 19 diagrammatically shows the modified form of circuit interrupting element in one position; and Fig. 20 in a similar manner shows the said element in the other position of circuit interruption.

As heretofore mentioned, the primary object of the present invention is to provide a circuit control mechanism operative to effect substantially instantaneous reversal in the direction of the rotation of a single phase electric motor. This mechanism includes a motor control switch, selectively operative reversing switches for changing the directions of the flow of current through the motor control switch and the starting winding and a means associated with the motor and the motor control switch for rendering said switch ineffective to continue the circuit through the starting winding of the motor when said motor has reached its predetermined operating speed while at the same time rendering said motor control switch effective to complete a reverse current flow through the starting winding when said selectively operating reversing switches are moved into a reversed position whereby the operating motor will be quickly decelerated, brought to a stop and immediately started to be rotated in the opposite direction.

The motor control switch of the centrifugal type used in the invention forms the subject matter of Patent 2,182,977, issued to Calvin J. Werner, December 12, 1939.

Referring to the drawings, the numeral 20 designates the frame of the electric motor in which a stator having windings 21 and 22 is provided, these windings being the starting and running windings respectively of the electric motor. An end cover 23 is provided for the main housing 20, this end cover providing a bearing in which the shaft 24 of the rotor 25 is journaled.

On the inside surface of the end cover 23 there is secured an insulating plate 26, screw studs 27 and 28 securing the plate 26 to the housing. This insulating plate 26 carries two pairs of stationary terminals, the one pair being designated in Fig. 1 by the numerals 30 and 31, the other pair by the numerals 32 and 33. These pairs of stationary terminals are engageable by a metallic bridging member 34 in the form of a plate having a frustro-conical shaped portion 35, providing a tapering annular wall 36 and a flat end wall 37 and being centrally apertured as at 38 to surround the rotor shaft 24 without contact therewith. This metallic bridging member has perforations surrounding the screw studs 27 and 28 which secure the insulating plate to the housing. A spring 40, surrounding the attachment stud 27, has its one end abutting against a head on said attachment stud, the other end of the spring abutting against an insulating collar provided in the aperture of the bridging member 34 surrounding said attachment stud. This spring yieldably urges the bridging member 34 in a tilting manner so that contacts on said member normally, electrically engage the stationary terminals 32 and 33 while other contacts on said member are out of engagement with the stationary terminals 30 and 31. The rotor shaft 24 has a transverse opening through which a stem or pin 41 slidably extends the one end of said stem having a head member 42 engaged by one end of a spring 43, the other end of said spring abutting against the rotor shaft 24. On the side of the shaft opposite the spring 43 stem 41 has a series of weights 45 secured thereto between which is clamped a fibrous, non-conducting washer 46 which is of greater diameter than the weights and frictionally engages the tapering wall 36 of the frusto-conically shaped portion 35 of bridging member 34. This stem 41 and its associated parts form the centrifugal device which controls the operation of the bridging member 34 in accordance with the operating speed of the motor. When the motor is at rest, spring 43 maintains the weights in the position as shown in Fig. 2 in which the fibrous, non-conductive washer 46 urges the bridging member 34 in a tilting manner against the effect of spring 40, the terminals 30 and 31 acting as the pivotal point and thus the bridging member 34 is held out of engagement with the stationary terminals 32 and 33 thereby disconnecting them one from the other and breaking any circuit which might be completed by their connection. As the motor rotor 25 and its shaft 24 begins to rotate increasedly the weights 45 will fly outwardly, due to centrifugal force, against the effect of spring 43 and consequently the fibrous washer 46 is moved radially outwardly relative to shaft 24 thereby causing the point of engagement between said fibrous washer and the frustro-conically shaped portion of the bridging member 34 to be moved outwardly along the sloping surface 36 of said bridging member 34, which movement, at a predetermined rotating speed of shaft 24, will permit spring 40 to become effective to tilt the bridging member 34, holding it in constant frictional engagement with the fibrous collar 46 so that eventually the stationary terminals 32 and 33 are engaged by the bridging member 34 and act as the fulcrum point about which the spring 40 further moves the bridging member 34 to disengage it from the stationary terminals 30 and 31. Under these circumstances the circuit completed by the engagement of the terminals 30 and 31 is discontinued and the circuit depending upon the connection of the terminals 32 or 33 is completed.

To accomplish the objects of the present invention for which this previously described motor control switch is provided, it is necessary to have a circuit interrupting mechanism associated with the motor control switch whereby the starting winding circuit is interrupted and discontinued while the motor is operating at a predetermined running speed, the motor control switch, however, being effective, when certain reversing switches are moved to another position, for establishing a reverse current flow through the starting winding so that electromagnetic forces are established to decelerate and finally bring the operating motor to a complete stop and then immediately start said motor in the opposite direction. This interrupting mechanism is illustrated by the drawings as consisting of a carrier having resilient arms 50 and 51, secured at one end to an insulating blade 52, the other end of said arms being arcuated to receive and carry arcuate blocks 53 and 54 oppositely disposed and consisting of any suitable wear-resisting friction material. When in position in the motor, blocks 53 and 54 encompass the rotor shaft 24 and are held in frictional engagement with shaft 24 by the resilient arms 50 and 51 in which said blocks are respectively secured. The insulating blade 52 supported by the arms 50 and 51 has an elongated aperture 55 through which the insulating plate support stud 28 extends, this aperture 55 being elongated to permit movement of the interrupter to a limited degree in one direction or the other with the shaft 24 frictionally engaged by said interrupter. The elongated slot 55 is of predetermined length so that the limited movement of the circuit interrupter blade 52 is predetermined in either direction.

In one position, as shown in Fig. 1, this circuit interrupter blade 52 is interposed between the bridging member 34 and the stationary terminal 33 while in the other position, into which it is moved by reverse rotation of the shaft 24, said insulating blade 52 is moved between the bridging element 34 and the stationary terminal 32. It will be noted that while the insulating blade 52, which is comparatively thin, is interposed between the bridging member and one of the stationary terminals engageable thereby the resulting transverse tilt of said member will permit the other stationary terminal of the pair actually to be engaged by the bridging member 34. This is particularly illustrated in Fig. 1 where the interrupter plate 52 prevents electrical contact between the bridging member 34 and the terminal 33 while the terminal 32 is engaged by said bridging member.

Figure 4:
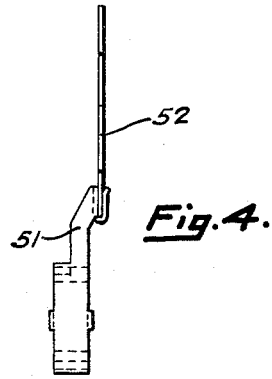
Fig. 4 is a side view of the element shown in Fig. 3.
Figure 5:
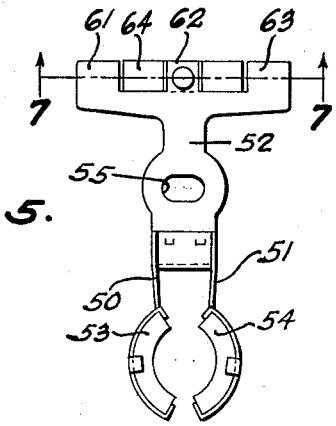
Fig. 5 is a front view of a modified form of circuit interrupting element.
Figure 6:
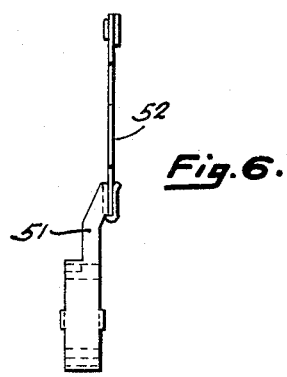
Fig. 6 is a side view of the element shown in Fig. 5.
Figure 7:
Fig. 7 is a detail sectional view on an enlarged scale, taken along line 7—7 in Fig. 5.

In Figs. 5 and 6 there is illustrated a modified form of this interrupter. Here the resilient arms 50 and 51 and the friction blocks 53 and 54 carried thereby are identical with that of the device shown in Figs. 3 and 4. However, the interrupter blade 52 in this instance is of different construction. Using the interrupter of Fig. 3 the bridging member 34 is tilted transversely because in one instance the interrupter blade 52 is between the bridging member and one terminal while the other terminal is engaged by the bridging member. In the reversed instance the bridging member is tilted, the other way transversely inasmuch as the interrupter is now between the other terminal and bridging member while the first-mentioned terminal is now engaged by said bridging member. The interrupter shown in Figs. 5 and 6 is constructed so as to avoid this slight transverse tilt of the bridging member 34. In this modified form the insulating plate 52 has three spaced tongues 61, 62 and 63, the tongue 62 being the central one spaced from the two outer ones 62 and 63. A metal conductor 64 is attached to the central insulating tongue 62 while the two opposite end portions of said conductor occupy the space between the two outer tongues 61 and 63 and the central tongue 62. Fig. 7 is an enlarged sectional view taken along the line 7—7 of Fig. 5 and shows how the metal conductor 64 occupies the space between the central and two outer tongue portions 61 and 63 of the insulating plate while the central portion of said conductor is rigidly secured to the central tongue 62 of the insulating plate. When this type of conductor is used it is constantly interposed between the bridging member 34 and the stationary terminals 32 or 33. In one position an insulating finger 63 separates the bridging member from a stationary terminal while at the same time the end of the metal conductor 64 most remote from the said insulating portion of the plate is interposed between the bridging member and the stationary terminal, this metal conductor thus electrically connecting the bridging member with the stationary terminal on this side. In the reverse position the insulating finger 61 will be moved between the bridging member 34 and a stationary terminal to disconnect them electrically while the metallic conductor most remote from the finger 61 will electrically connect the bridging member and the opposite stationary terminal.

Movement of the interrupter plate 52 into one or the other of its positions relative to the bridging member 34 sets up certain connections for establishing reversal of the motor, such connections being necessary to establish a circuit in the starting winding of the motor which will decelerate the operating motor, bring it to a stop and substantially immediately cause it to rotate in the opposite direction. These other circuits are effected by the concurrent operation of two reversing switches disclosed in views 8 to 18 respectively, which views illustrate diagrammatically the positions of the various elements and their established circuits at different stages of the motor operation. These reversing switches are designated by the numerals 70 and 71. Reversing switch 70 includes a movable contact 72 in electrical connection with the movable contact 82 of a master switch which is adapted to be closed to complete the one side 85 of the power line circuit. Switch 70 also has two stationary terminals 73 and 74 with which the movable contact member 72 may engage. Like switch 70, switch 71 has a movable contact member 75 engageable with either of the stationary terminals 76 or 77 of this switch. The running winding 22 has its one end connected to the movable contact arm 82 of the master switch, while the other end of said winding is electrically connected to the opposite power line 83. This power line is also connected with the movable contact member 75 of switch 71. Terminal 76 of switch 71 is electrically connected with the stationary terminal 73 of the switch 70 and also with one end of the starting winding 21, the other end of said winding being electrically connected to the bridging member 34 by a flexible, pigtail connection 84. Terminal 77 of switch 71 is electrically connected with terminal 33 of the motor control switch and also with the terminal 31 of said switch. The terminal 74 of switch 70 is connected with both terminals 32 and 30 of the motor control switch.

Fig. 8 diagrammatically shows the position of the various elements and their circuit connections when the motor is at rest. Switches 70 and 71 have their movable contact members 72 and 75 respectively in a selected position in which they respectively engage stationary terminals 74 and 76. Now, when the motor is to be started switch 82 is moved to engage the power line 85 as shown in Fig. 9, thereby permitting current to flow from the power line 83 across switch 71 to the starting winding 21, through the pigtail connection 84 to the motor control switch bridging member 34 which, due to the motor being at rest, has the bridging member 34 in electric engagement with the terminals 30 and 31. Due to this position of the bridging member 34 current flows from the terminal 30 to the terminal 74 of switch 70 and thence through the movable contact member 72 thereof back to the other power line 85 through switch 82. This establishes an energizing circuit through the starting winding 21 which will result in a rotation of the electric motor in one direction. For purposes of this description we will suppose it to be in counterclockwise direction. Closing of switch 82 also permits current to flow from the power line 83 through switch 82 and the running winding 22 to the opposite power line 85 and thereby energize the running winding 22. Now the motor will rotate in a counterclockwise direction and as it increases in rotative speed the centrifugal mechanism on the motor rotor shaft 24 will be actuated to permit spring 40 to become effective to tilt the bridging member 34 into its opposite position in which it will disengage terminals 30 and 31 and be moved to engage terminals 32 or 33. However, as the motor starts to rotate in a counterclockwise direction its rotating shaft carries the interrupter with it for a limited distance, sufficiently to move the insulating plate 52 thereof between the bridging member 34 and the terminal 32. Thus as the bridging member 34 is tilted by the spring 40 it will not electrically engage the terminal 32 but will engage the terminal 33. Now the circuit through the starting winding 21 is interrupted and discontinued for the bridging member 34 no longer engages terminal 30 which completes the starting winding circuit and terminal 32 is insulated from the bridging member 34 by the insulating plate 52 so that the starting winding circuit cannot be completed through the stationary terminal 74 and the movable contact 72 of of the switch 70. Terminal 33, now electrically engaged by the bridging member 34, will not close a circuit for terminal 33 is connected to terminals 31 and 77 of the motor switch and switch 71 respectively which are not electrically engaged or energized by any portion of the device at this time. Thus, the starting winding 21 is inactive, the motor operation being continued only under the effects of the running winding 22 which is maintained in circuit. Fig. 10 shows all of the elements of the control mechanism and their circuits as just described, thereby rendering the running winding 22 effective and the starting winding 21 inactive. If it is desired to reverse the operation of the electric motor, switches 70 and 71 are operated concurrently into a reverse position as shown in Fig. 11, in which the movable contact element 72 of switch 70 engages terminal 73 and disengages terminal 74 while movable contact arm 75 of switch 71 disengages terminal 76 and engages terminal 77. The motor control switch is still in the position to maintain motor operation in the counterclockwise direction as previously described. With the shifting of switches 70 and 71, as shown in Fig. 11, the following circuits are established: from the power line 83 across switch 71 and its terminal 77 to the terminal 33 of the motor control switch through the bridging member 34 engaging said terminal thence through the pigtail connection 84 and through the starting winding 21 of the motor, in opposite direction to that shown in Fig. 9, however, thence through terminal 73 and movable contact 72 of the switch 70 and across the master switch 82 to the opposite power line 85. With the starting winding 21 now in electrical circuit and in a reverse direction from that previously established, said starting winding becomes effective to decelerate the operating motor inasmuch as said starting winding is setting up in cooperation with the running winding counter-electromotive forces which oppose the established forces in the motor tending to rotate the motor in one direction while the cooperating starting and running windings are tending to rotate the motor in the opposite direction. This opposing force quickly brings the motor to a complete stop and during the deceleration, that is, when the motor has reached a predetermined low speed, the centrifugal device on the rotor shaft 24 will become operative to move the bridging member against the effect of spring 40 whereby it moves the bridging member 34 away from the terminals 32 and 33 and into engagement with the terminals 31 (Fig. 12) and then 30 of said motor control switch. This is clearly illustrated in Fig. 13. Immediately after the motor has been completely stopped the counter-electromotive forces set up by energization of the starting winding 21 due to current flowing in the opposite direction will cause the motor to be rotated in said opposite direction in this instance clockwise. As soon as the motor accelerates in its clockwise rotation to a predetermined speed the motor control switch will be actuated so that it disengages contacts 30 and 31 and it moves toward engagement with contacts 32 and 33. However, as the motor is started in clockwise direction the rotating shaft 24 will carry the interrupter mechanism with it, causing the insulating plate 52 of said interrupter mechanism to be moved from between terminal 32 and the bridging member 34 and into the position between terminal 33 and said bridging member 34 (Fig. 14) so the bridging member 34 can not electrically engage terminal 33 while it is electrically engaging terminal 32. In this position the motor control switch discontinues the current flow through the starting winding 21 and therefore renders it inactive, the running winding 22 providing the only motivating force for the electric motor. This is clearly illustrated in Fig. 15.

To again reverse motor operation, switches 70 and 71 are moved into their circuit-making position, as shown in Fig. 16, which is identical to the position shown in Fig. 9. Now a circuit is established through the starting winding 21 in the opposite direction causing said starting winding in cooperation with the running winding to set up electromotive forces for turning the motor in the opposite direction, in this instance again in a counterclockwise direction. The energized starting winding 21 now will cause deceleration in the clockwise speed of the electro-motor and during this deceleration the motor control switch is moved into the position as shown in Fig. 17 in which the bridging member electrically connects terminals 30 and 31 and entirely disengages the opposite stationary terminals of this switch. When the speed of the motor running clockwise reaches a predetermined value the bridging member 34 will again be actuated into the position as shown in Fig. 10; then during acceleration in the counterclockwise direction the insulating plate 52 again is moved between the bridging member 34 and the terminal 32 in response to the reversal in rotation of the rotor shaft 24 of the electric motor.

From the aforegoing it may be seen that the starting winding of the electric motor is rendered effective for starting the motor and rendered ineffective when the motor reaches a predetermined operating speed. However, movement of selective electric switch into a different circuit closing position will render the starting winding effective to exert electromotive force tending to operate the motor in opposite direction while still being operated in the first direction. This effect by the starting winding will decelerate the motor and bring it to a complete stop and then immediately cause its rotation in the reversed direction. During this deceleration the motor control switch is shifted to change its electrical connections whereby the starting winding is effective until reverse operation of the electric motor at a predetermined speed again actuates the motor control switch to discontinue the starting winding circuit and maintain said circuit ineffective until the selective reverse switches are again moved into their opposite positions for motor reversal purposes.

Fig. 18 illustrates diagrammatically a compound reversing switch mechanism in which operation of the reversing switches into either one or the other of their circuit closing positions will concurrently close the main power line whereby the running winding circuit is maintained as long as these selective switches are in either one of their circuit closing positions. Here the switch 82 of Figs. 8 to 17 inclusive is replaced by the movable contact arm 172 and a stationary terminal 173 which are in constant engagement as this switch is moved from one directional circuit closing position into the opposite directional closing position. The numeral 175 designates the counterpart of the similar element 75 of switch 71 and both elements 172 and 175 are tied together by a common operating element 176 so that both switches are moved into one position or the other concurrently. Figs. 19 and 20 indicate diagrammatically the two positions in which the modified interrupter shown in Figs. 5 and 6 makes and interrupts the circuits controlled by the bridging member 34 and its cooperating stationary terminals 32 and 33. Fig. 19 shows the terminal 32 in electrical connection with the bridging member 34 and the terminal 33 isolated from the bridging member 34 by the insulating tongue 63 of the insulator 52. Fig. 20 illustrates the opposite in which terminal 33 is electrically connected with the bridging member 34 and terminal 32 is disengaged from the bridging member 34 by the insulating tongue portion 61 of the insulating plate 52.

The present connections and the operation of the motor control switch with its circuit interrupter member operate quickly and positively so that reverse switches 70 and 71 may successively and quickly be moved from one position to the other for causing substantially immediate reversal of the electric motor rotation without causing any mechanical or electrical injury thereto.

While the embodiment of the present invention as herein disclosed, constitutes a preferred form, it is to be understood that other forms might be adopted.

What is claimed is as follows:

1. A reversing mechanism for an electric motor having a starting and a running winding said mechanism comprising a motor controlled switch having two pairs of stationary terminals and a movable bridging contact operative, when the motor is at rest or operating at a predetermined low speed to engage the one pair of terminals and at speeds exceeding said predetermined low speed to disengage the one pair and to move toward engagement of the other pair of terminals; two concurrently operative switches each connected with a respective power line and each being operative into one or the other of two circuit making positions in one of which the one switch connects the one power line directly with the starting winding which is also electrically connected with the movable bridging element of the motor controlled switch, and in which the other concurrently operative switch connects with the other power line with a terminal of each pair of stationary terminals, and in the other position the said one switch connects the one power line with the other terminal of each pair of stationary terminals and said other concurrently operative switch connects the said other power line with the starting winding whereby current flow through the starting winding is reversed; and circuit interrupting means movable between one or the other of said terminals engageable by the bridging contact at motor speeds exceeding said predetermined low speed, in response to and in accordance with reversal of motor operation, for rendering the starting winding inactive during motor operation above said low speeds and until the position of the concurrently operative switches is changed.

2. In combination with a reversible electric motor having a rotor, a starting and a running winding, a starter switch controlled by the motor in accordance with its operating speed, said switch consisting of two pairs of stationary terminals and a tiltable bridging member normally connecting one pair of terminals while the motor is not running or running below a predetermined speed, and connecting the other pair of terminals while the motor is running at or above said predetermined speed; switching means connected to a power source and selectively operative to effect energization of the running winding and to direct current flow through the starter switch and the starting winding in one direction or the other for effecting starting of the motor in one direction or the other respectively; and a circuit interrupter interposed between the tiltable bridging member and one pair of the stationary terminals, said interrupter being frictionally attached to the rotor so as to be shifted from one position into another by the reversal of the rotor rotation and interposing an insulating member between the bridging member and one of the terminals of the pair of terminals engageable by the said member when the motor operates at said predetermined speed, for interrupting the circuit through the starting winding and at the same time providing for electrical connection between the said member and the other terminal of said pair for effecting a reverse current flow through the starting winding in response to reversal of the selectively operative switching means, whereby the operating motor is quickly decelerated, stopped and caused to run in the opposite direction.

3. In combination with a reversible single phase electric motor, a motor controlled switch having one set of contact means normally in circuit closing position while the motor is at rest or operating at a predetermined low speed and a dual set of paired contact means normally open and movable into circuit closing position in response to the motor operating at a predetermined higher speed; switch means for reversing current flow through the motor controlled switch; and motor actuated insulator means disposed between the said dual contact means for free movement relative to the same and selectively positionable between either of said dual sets of contact means operative to open circuit through one of said dual sets of contact means in accordance with the direction of motor operation.

4. A device in accordance with claim 3 in which said motor actuated insulator is frictionally driven by the motor shaft selectively in one direction or the other, said insulator rendering one set of the dual set of contact means ineffective and the other of the dual sets of contact means effective to complete a circuit when said switch is in position resulting from higher motor speeds.

5. A device in accordance with claim 3 in which the motor controlled switch has the contact means thereof consisting of two pairs of stationary terminals and a movable bridging contactor adapted, in one circuit closing position, to engage and electrically connect one pair of terminals and to disconnect the second pair of terminals, and in a second circuit closing position of the switch to disconnect the said one pair of terminals and connect the said second pair of terminals, the insulator means to change the circuit closing characteristics of said switch comprising an insulated member interposed between the second pair of terminals and the bridging contact to insulate one of said second pair of terminals therefrom and movable by the motor shaft in one direction or the other as said motor rotates in one direction or the other respectively for selectively insulating either of said second pair of terminals from said movable bridging contact while providing engagement of the other terminal of the said pair of terminals by said bridging contact when said motor is operating above the predetermined low speed.

6. In a reversible single phase motor, a combined selector and starting switch comprising, two pairs of stationary terminals, a tiltable bridging member engaging and electrically connecting one pair of terminals when the motor is inactive or is operating below a predetermined speed and for engaging the second pair of terminals when the motor is operating above a predetermined speed, actuating means responsive to the speed of the motor engaging said bridging member for tilting movement of the same between said pairs of terminals as the motor speed increases, an insulating member positioned between said second pair of terminals and said bridging member movable relative to said terminals and electrically insulating one of said second pair of terminals from said bridging member when adjacent thereto, and actuating means operably connected with said insulating member and actuated by motor rotation in either direction for moving said insulating member into position between either of said second pair of terminals and said bridging member selectively depending on the direction of rotation of the motor.

7. In a reversible single phase motor having a running winding and a starting winding, switch means for connecting said starting winding to a single phase supply line reversibly for starting of said motor in one direction and thereafter establishing circuit relationships for reversing current through said starting winding upon reversal of current from the supply line, said switch means comprising two pairs of stationary terminals, a tiltable bridging member positioned adjacent said terminals for bridging contact between one of said pairs of terminals when the motor is inactive or is operating below a predetermined speed and for engaging the second pair of terminals when the motor is operating above a predetermined speed, said bridging member being connected electrically in series with said starting winding, each of said pairs of terminals having the terminals on corresponding sides of said bridging means connected electrically in parallel and to one side of a source of power through switch means electrically in series with said parallel connected terminals, said last-mentioned switch means having two positions for selectively connecting said parallel connected terminals with either side of a single-phase power source to alter the direction of flow of current therethrough, an insulating member positioned between one of said pairs of stationary terminals and said bridging member for insulating said bridging member from one of said stationary pairs of stationary terminals while permitting the other of said stationary terminals to engage the bridging member, and actuating means operably connected with said insulating member and actuated by the motor in accordance with the direction of rotation thereof to move said insulating member into position selectively between the said pair of stationary terminals and the bridging member dependent on the direction of rotation of the motor.

8. A combined selector and centrifugal starting switch for a single-phase motor comprising, a tiltable plate having a hole toward one end thereof loosely surrounding the shaft of the motor, said tiltable plate having two pairs of contact means toward the opposite end thereof, a stationary plate on the motor having two pairs of contacts thereon cooperating with and engageable by the pairs of contact means on said plate upon tilting movement of said tiltable plate relative to said stationary plate, centrifugally acting means actuated by motor speed engaging the said one end of said tiltable plate for moving the same relative to the stationary plate to cause tilting movement of the said tiltable plate relative to said stationary plate and upon said pairs of contact means, resiliently acting means operably connected to the opposite end of said tiltable plate opposing movement thereof by said centrifugally acting means, said centrifugally acting means and said resiliently acting means cooperating to cause tilting movement of said tiltable plate on alternate of said pairs of contacts upon either increasing or decreasing speed of the motor, and a circuit interrupter interposed between said tiltable plate and said stationary plate and movable relative thereto for positioning thereof selectively between either of cooperating contacts of one of said pairs of contacts to interrupt circuit therebetween, and actuating means connected with said interrupter and operated in response to the direction of rotation of the motor for moving the interrupter selectively between the said cooperating pairs of contacts in accordance with direction of rotation of the motor.

9. A combined selector and centrifugal starting switch for a single-phase motor comprising, a tiltable plate having a hole toward one end thereof loosely surrounding the shaft of the motor, said tiltable plate having two pairs of contact means toward the opposite end thereof, a stationary plate on the motor having two pairs of contacts thereon cooperating with and engageable by the pairs of contact means on said plate upon tilting movement of said tiltable plate relative to said stationary plate, centrifugally acting means actuated by motor speed engaging the said one end of said tiltable plate for moving the same relative to the stationary plate to cause tilting movement of the said tiltable plate relative to said stationary plate and upon said pairs of contact means, resiliently acting means operably connected to the opposite end of said tiltable plate opposing movement thereof by said centrifugally acting means, said centrifugally acting means and said resiliently acting means cooperating to cause tilting movement of said tiltable plate on alternate of said pairs of contacts upon either increasing or decreasing speed of the motor, and a circuit interrupter interposed between said tiltable plate and said stationary plate and movable relative thereto for positioning thereof selectively between either of cooperating contacts of one of said pairs of contacts to interrupt circuit therebetween, said interrupter comprising an arm having an insulating member thereon positioned selectively between the said pairs of contacts and a pair of resilient arms extending therefrom having friction shoes engageable with the motor shaft for causing movement of said interrupter in accordance with the direction of rotation of the motor shaft.

CLYDE C. FREY.

References Cited in the file of this patent

UNITED STATES PATENTS

| Number | Name | Date |
|---|---|---|
| 2,205,787 | Brongersma | June 25, 1940 |
| 2,382,827 | Sprague et al. | Aug. 14, 1945 |
| 2,389,381 | McLennan | Nov. 20, 1945 |
| 2,406,430 | Mason | Aug. 27, 1946 |
| 2,528,845 | Sprague | Nov. 7, 1950 |
| 2,586,734 | Sprague et al. | Feb. 19, 1952 |
| 2,598,440 | Reek | May 27, 1952 |